(12) United States Patent
Cho et al.

(10) Patent No.: US 9,829,063 B2
(45) Date of Patent: Nov. 28, 2017

(54) SEISMIC ISOLATOR UTILIZING WEDGE

(71) Applicant: Yeoung Cheol Cho, Seoul (KR)

(72) Inventors: Yeoung Cheol Cho, Seoul (KR); You In Lee, Gyeonggi-do (KR); Yong Soo Ji, Gyeonggi-do (KR); Joon-Ho Baek, Gyeonggi-do (KR); In Seok Bang, Incheon (KR)

(73) Assignee: Yeoung Cheol Cho, Seoul (KR)

( * ) Notice: Subject to any disclaimer, the term of this patent is extended or adjusted under 35 U.S.C. 154(b) by 0 days.

(21) Appl. No.: 15/117,633

(22) PCT Filed: Mar. 21, 2014

(86) PCT No.: PCT/KR2014/002412
§ 371 (c)(1),
(2) Date: Aug. 9, 2016

(87) PCT Pub. No.: WO2015/125996
PCT Pub. Date: Aug. 27, 2015

(65) Prior Publication Data
US 2016/0348751 A1    Dec. 1, 2016

(30) Foreign Application Priority Data
Feb. 18, 2014  (KR) .................. 10-2014-0018521

(51) Int. Cl.
*F16F 15/06*   (2006.01)
*F16F 15/067*  (2006.01)
*E04B 1/98*    (2006.01)

(52) U.S. Cl.
CPC .............. *F16F 15/067* (2013.01); *E04B 1/98* (2013.01)

(58) Field of Classification Search
CPC .................. F16F 15/067; E04B 1/98
See application file for complete search history.

(56) References Cited

U.S. PATENT DOCUMENTS 2,359,000 A * 9/1944 Siegfried .............. F16F 15/067
                                                         248/562
3,356,331 A * 12/1967 Springuel ................ B21J 13/06
                                                         188/129

(Continued)

FOREIGN PATENT DOCUMENTS

JP    63210433 A    9/1988
JP    7056326 Y2   12/1995

(Continued)

OTHER PUBLICATIONS

International Search Report issued in the corresponding International Application No. PCT/KR2014002412 on November 5, 2014.

*Primary Examiner* — Anita M King
(74) *Attorney, Agent, or Firm* — Roberts Mlotkowski Safran Cole & Calderon P.C.

(57) ABSTRACT

A seismic isolator is provided, which is excellent in vertical shock-absorbing and vibration reducing, has more functions of horizontal shock-absorbing, recovering, and reaction-force resisting, is easy to install while adjusting the horizontal level of supporting structure in the construction site, and is able to adjust the height of the supporting structure even after installed in the construction site. The seismic isolator includes a wedge unit including a rod, a pair of wedges installed movably along the rod, a horizontal elastic body engaging the rod and supporting the pair of wedges and a supporting means supporting the horizontal elastic body, a wedge bottom surface member supporting the pair of wedges while surface-contacting a wedge bottom surface of the wedge surface of the pair of wedges, and a wedge top surface member supported by the pair of wedges while surface-contacting a wedge top surface of the wedge surface of the pair of wedges.

20 Claims, 10 Drawing Sheets

(56) References Cited

U.S. PATENT DOCUMENTS

| | | | | |
|---|---|---|---|---|
| 4,674,725 A | * | 6/1987 | Popper | F16F 7/00 |
| | | | | 188/380 |
| 8,567,572 B2 | | 10/2013 | Lafitte et al. | |
| 2009/0269157 A1 | | 10/2009 | Spieth et al. | |

FOREIGN PATENT DOCUMENTS

| | | | |
|---|---|---|---|
| JP | 2006336815 A | | 12/2006 |
| KR | 100783010 B1 | * | 12/2007 |
| KR | 101320627 B1 | | 10/2013 |
| KR | 101427522 B1 | * | 8/2014 |

\* cited by examiner

SEISMIC ISOLATOR UTILIZING WEDGE

CROSS-REFERENCE TO RELATED APPLICATIONS

The present application is a U.S. National Phase of PCT/KR2014/002412 filed on Mar. 21, 2014 claiming priority to Korean Patent application No. 10-2014-0018521 filed Feb. 18, 2014. The disclosure of the PCT Application is hereby incorporated by reference into the present Application.

TECHNICAL FIELD

The invention relates to improvements in a seismic isolator utilizing wedge, especially to improvements in a seismic isolator utilizing wedge, which can be used more usefully for supporting massive structures such as an electrical power equipment, etc. and sometimes for supporting a light structures.

BACKGROUND ART

In general, in massive structures such as electrical power equipment, gas tank, a bridge for vehicles, a high-speed train station building on top of which high-speed trains are driven, general building structures, etc., an upper structure and a lower structure are formed separately in order to guarantee reliability of the structures against earthquakes or vibrations, and a seismic isolator is installed between the upper and lower structures for supporting elastically the weight of the upper structure and reducing vibrations in vertical and/or horizontal directions.

Conventional seismic isolators were disclosed in a Korean Patent Publication KR 10-1210656 (title: Seismic isolator for electrical equipment for controlling vibrations along 3 axes, inventor: Sanghoon Oh). This Oh patent had problems: since weight of upper structure was supported by the force of spring only the vertical vibration reduction is small, since a compressed state must be maintained for a long time it may cause a problem in using for an extended period of time, and after a horizontal displacement by earthquakes it cannot return horizontally to an original position.

And, other types of seismic isolator using wedge was disclosed in another Korean Patent Publication KR 10-0716088 (title: Vertical Vibration Reducing Bearing using friction, inventor: Youngcheol Cho). The seismic isolator disclosed in the Cho patent is adapted for supporting a highly massive structure with very large weight such as an upper structure of a bridge, but is not appropriate to support electrical power equipments, which have less weight than the highly massive structure and include relatively weak materials, for some shock-absorbing in up and down directions and/or horizontal directions.

DISCLOSURE OF INVENTION

Technical Problem

An objective of the invention is to provide a seismic isolator utilizing wedge, which can be suitably used for supporting a massive structure such as electrical power equipment and preventing damages to the components installed in the structure.

Another objective of the invention is to provide a seismic isolator utilizing wedge, which is excellent in absorbing shock in a vertical direction as well as in reducing vibrations in the vertical direction.

Still another objective of the invention is to provide a seismic isolator utilizing wedge, which is excellent in absorbing shock in a vertical direction and reducing vibrations in the vertical direction and also in reducing vibrations in the horizontal direction.

Still another objective of the invention is to provide a seismic isolator utilizing wedge, which is excellent in absorbing shock and reducing vibrations in a vertical direction, and also in recovering in the horizontal direction.

Still another objective of the invention is to provide a seismic isolator utilizing wedge, which is excellent in absorbing shock and reducing vibrations in the vertical direction and in recovering and reducing vibrations in the horizontal direction, and also in resisting negative reaction force.

Still another objective of the invention is to provide a seismic isolator utilizing wedge, which is excellent in absorbing shock and reducing vibrations in the vertical direction and in recovering and reducing vibrations in the horizontal direction and resisting negative reaction force, and also in supporting a structure with a very large weight.

Still another objective of the invention is to provide a seismic isolator utilizing wedge, which is excellent in absorbing shock and reducing vibrations in the vertical direction and in recovering and reducing vibrations in the horizontal direction and resisting negative reaction force, and also in being suitable for a seismic isolator for an equipment that has to be installed as maintaining a horizontal level of supporting equipments in a construction place since a height of supporting of the supporting equipments can be adjusted easily.

Still another objective of the invention is to provide a seismic isolator utilizing wedge, which can be used as a seismic isolator for a light-weight structure.

Solution to Problem

According to an aspect of the invention, a seismic isolator utilizing wedge comprises:

a wedge unit including a rod, a pair of wedges installed movably along the rod and having two wedge surfaces facing each other, a horizontal elastic body engaging the rod and supporting in a direction for the pair of wedges to come near, and a supporting means supporting the horizontal elastic body toward the wedges;

a wedge bottom surface member supporting the pair of wedges as surface-contacting the wedge bottom surfaces of the pair of wedges and applying friction against the wedge bottom surfaces when the wedges move along the rod; and a wedge top surface member rising and falling according to a change of weight acting by supporting on the pair of wedges while surface-contacting with the wedge top surface of the wedge surface of the pair of wedges, generating friction with the wedge top surface, and receiving an elastic force of the horizontal elastic body through the wedge.

It is preferable that a vertical-elastic-supporting device for shock-absorbing or supporting force interacting between the wedge bottom surface member and the wedge top surface member is provided between the wedge bottom surface member and the wedge top surface member.

It is preferable that the vertical-elastic-supporting device comprises an axle member having a lower end supported by the wedge bottom surface member and an upper end inserted into a hole or groove formed in the wedge top surface member and allowing the rising and falling of the wedge top surface member and a vertical elastic body engaging an outer cylindrical surface of the axle member and supporting between the wedge bottom surface member and the wedge top surface member.

A latching step may be formed at a top portion of the hole or groove in the wedge top surface member, the lower end of the axle member may be fixed to the wedge bottom surface member, and at the upper end of the axle member may be installed the a reaction-force resisting step for preventing the wedge top surface member from rising beyond a predetermined spot by being latched to the latching step.

It is preferable that in the wedge bottom surface member, the wedge top surface member, and corresponding contacting spherical surface of the wedges are formed guiding portions and guided portions for guiding and being guided in moving as surface-contacted together and preventing the wedge from disengaging sideways with respect to the wedge bottom surface member and the wedge top surface member.

A latching step may be formed at a top portion of a hole or groove in the wedge top surface member, an axle member is installed between the wedge top surface member and the wedge bottom surface member, a lower end of the axle member is fixed to the wedge bottom surface member and at an upper end of the axle member that pass through the hole is installed a reaction-force resisting step for preventing the wedge top surface member from rising beyond a predetermined spot by being latched to the latching step.

In certain embodiments, a horizontal seismic isolating device may be installed on top of the wedge top surface member, which engages an upper structure and allows the upper structure to move in any one direction of forward and backward and to the right and left with respect to the wedge top surface member or two directions of forward and backward and to the right and left with respect to the wedge top surface member.

It is preferable that the horizontal seismic isolating device comprises a concave spherical member installed in the wedge top surface member and formed with a first concave spherical surface on the top, a spherical block having a first convex spherical surface surface-contacting the first concave spherical surface formed on a bottom surface thereof and a second convex spherical surface with a curvature larger than that of the first convex spherical surface on a top surface thereof, and an upper member supported through a surface-contacting to the second convex spherical surface on a bottom surface so as to be movable in both directions forward and backward and to the right and left.

It is preferable that the pair of wedges, the wedge bottom surface members, the wedge top surface members, and the horizontal elastic bodies are disposed left-right symmetrically, and the wedge top surfaces and the wedge bottom surfaces are top-bottom symmetrical.

Preferably, the supporting means comprises a supporting body that is installed movably along the rod for supporting the horizontal elastic body, and a nut that is configured to adjust an extent that the horizontal elastic body presses the wedge by screw-engaging the rod outside the supporting body supporting the horizontal elastic body and adjusting a position of the supporting means.

In certain embodiments, the wedge may be made of ultra-high molecular weight polyethylene (UHMW-PE) or engineering plastic, and the wedge bottom surface member and the wedge top surface member may be made of metal.

In certain embodiments, the horizontal seismic isolating device may comprise a concave spherical member installed in the wedge top surface member and including a first concave spherical surface formed on a top surface thereof, a ball installed in the first concave spherical surface, and a top portion member including a second concave spherical surface having a curvature larger than that of the first concave spherical surface on the bottom thereof and being able to move both directions forward and backward and to the right and left while supported by the ball.

Advantageous Effects of Invention

A seismic isolator according to the invention provides a seismic isolator utilizing wedge, which is excellent in absorbing shock and reducing vibrations in a vertical direction and if necessary it further has functions of reducing vibrations and recovering in the horizontal direction, and also in resisting negative reaction force.

In addition to having the above advantages, the seismic isolator according to the invention is suitable for an equipment that has to be installed as maintaining a horizontal level of supporting equipments in a construction place since a height of supporting of the supporting equipments can be adjusted easily.

A seismic isolator according to the invention may be used as a device for adjusting height having functions of adjusting the height of supporting structure while installed in a construction site and absorbing shocks if necessary.

A seismic isolator according to the invention may be used for supporting a large vertical weight since the vertical-elastic-supporting device and the wedge member divide and support the weight of the upper structure, and may increase the effects of shock-absorbing in a direction of up and down and reducing vibrations caused by friction since the vertical-elastic-supporting device divides the vertical weight and an angle between the wedge top surface and the wedge bottom surface can get large compared to a case without any vertical-elastic-supporting device.

BEST MODE FOR CARRYING OUT THE INVENTION

Below, referring to the Drawings, preferable embodiments of the invention are going to be described in detail.

Figure 1:
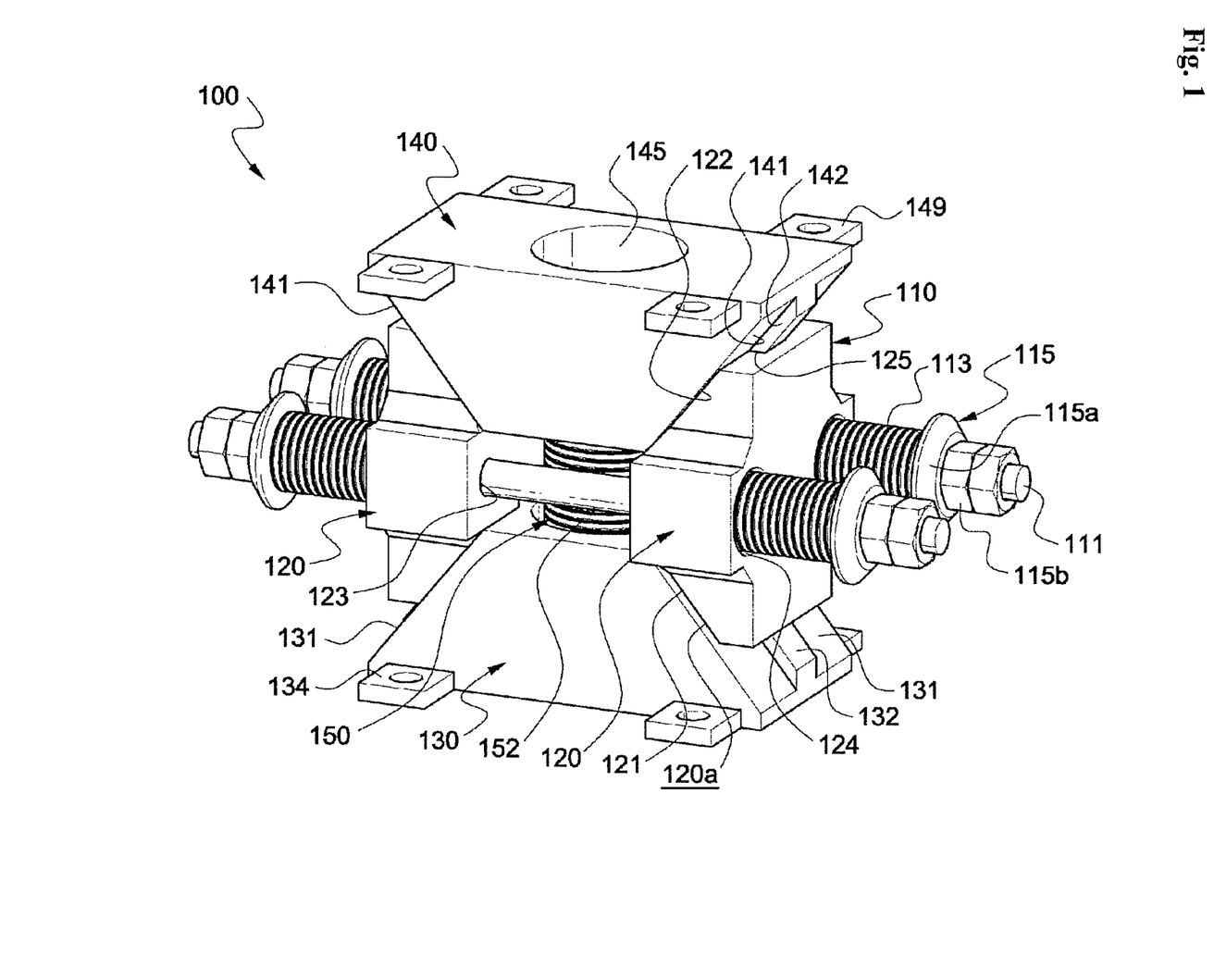
FIG. 1 is a perspective view of a seismic isolator utilizing wedge according to an embodiment of the invention.
Figure 2:
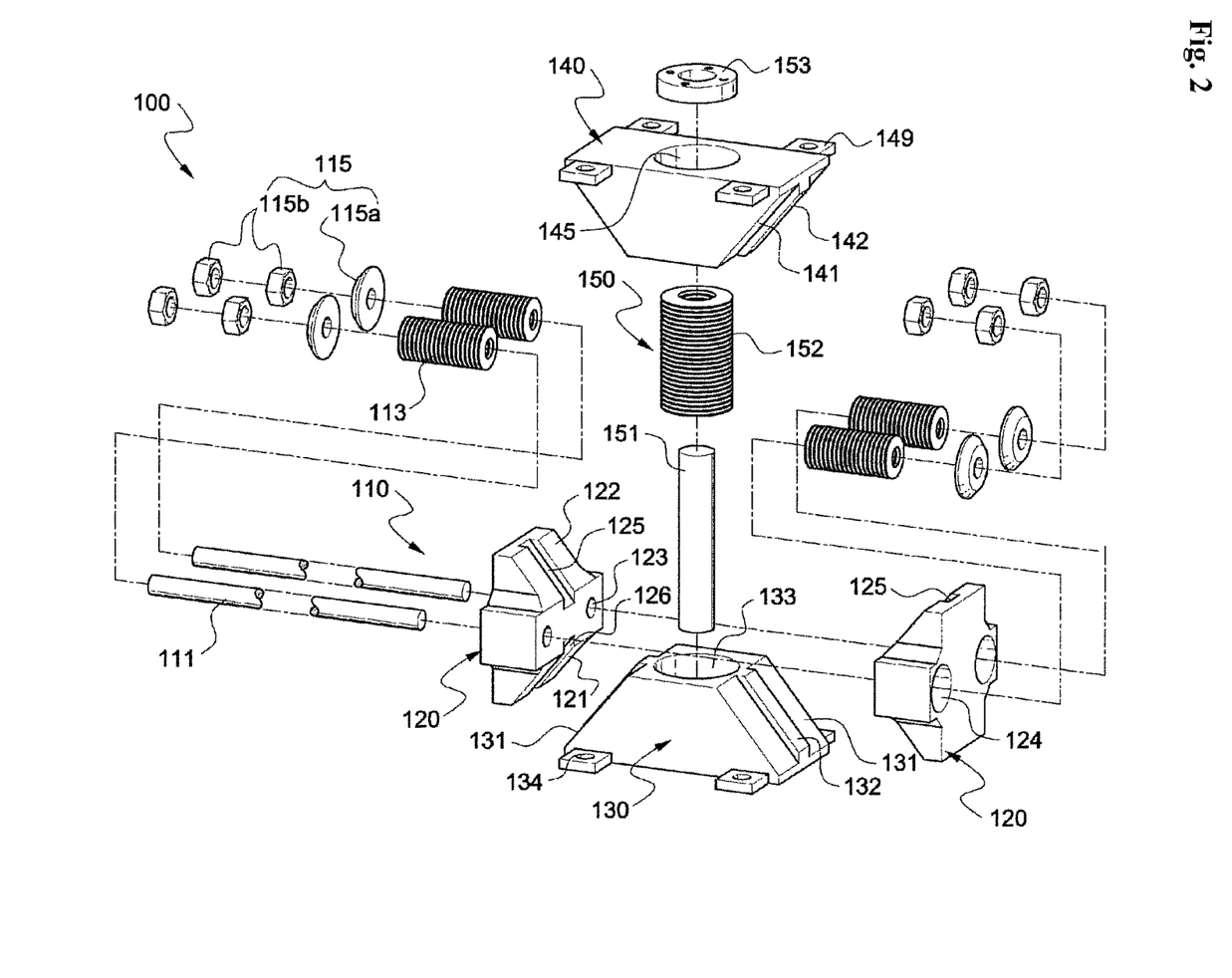
FIG. 2 is an exploded perspective view of the seismic isolator of FIG. 1.
Figure 3:
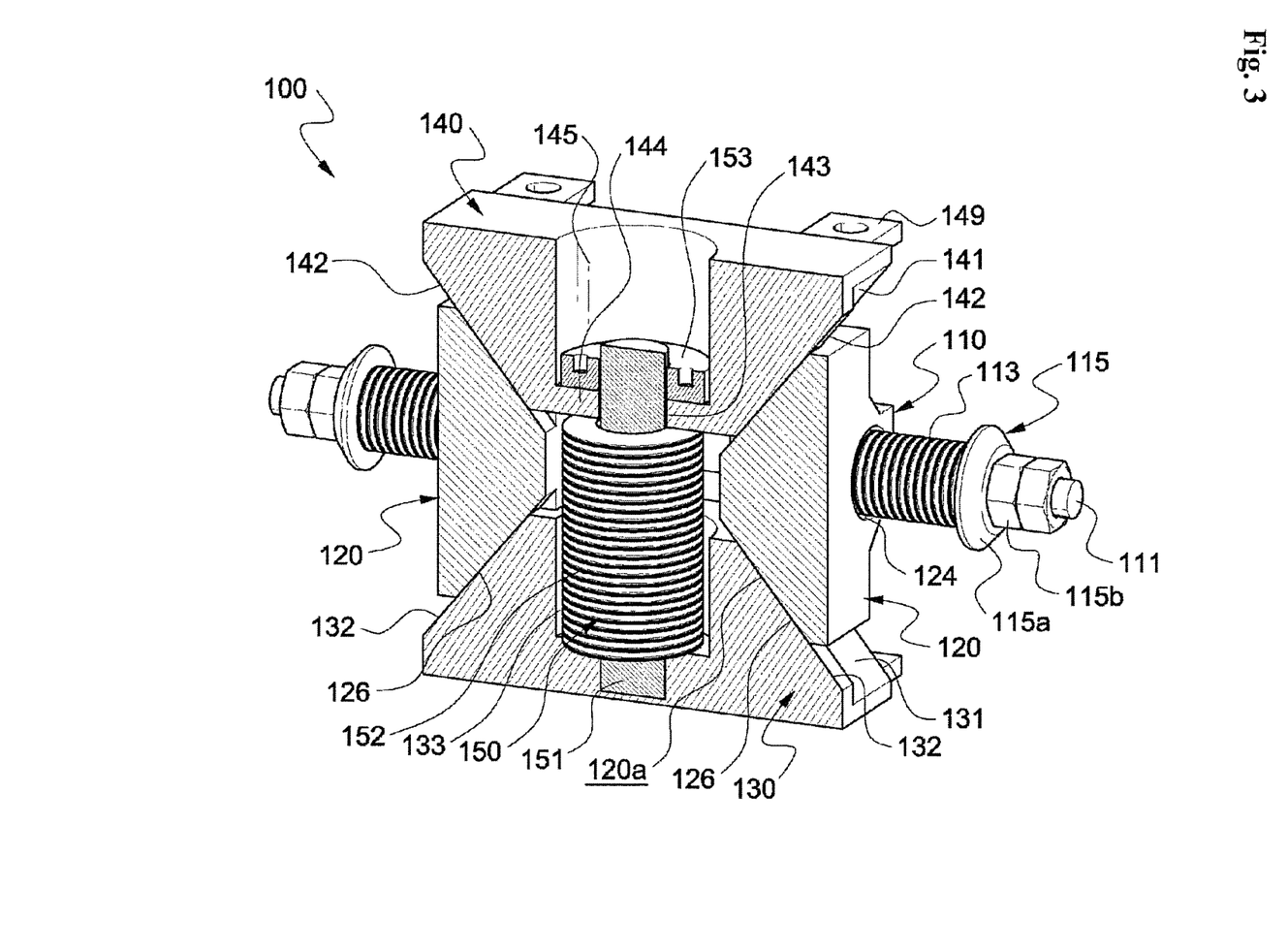
FIG. 3 is a half-cut perspective view of the seismic isolator of FIG. 1 showing the inside thereof.
Figure 4:
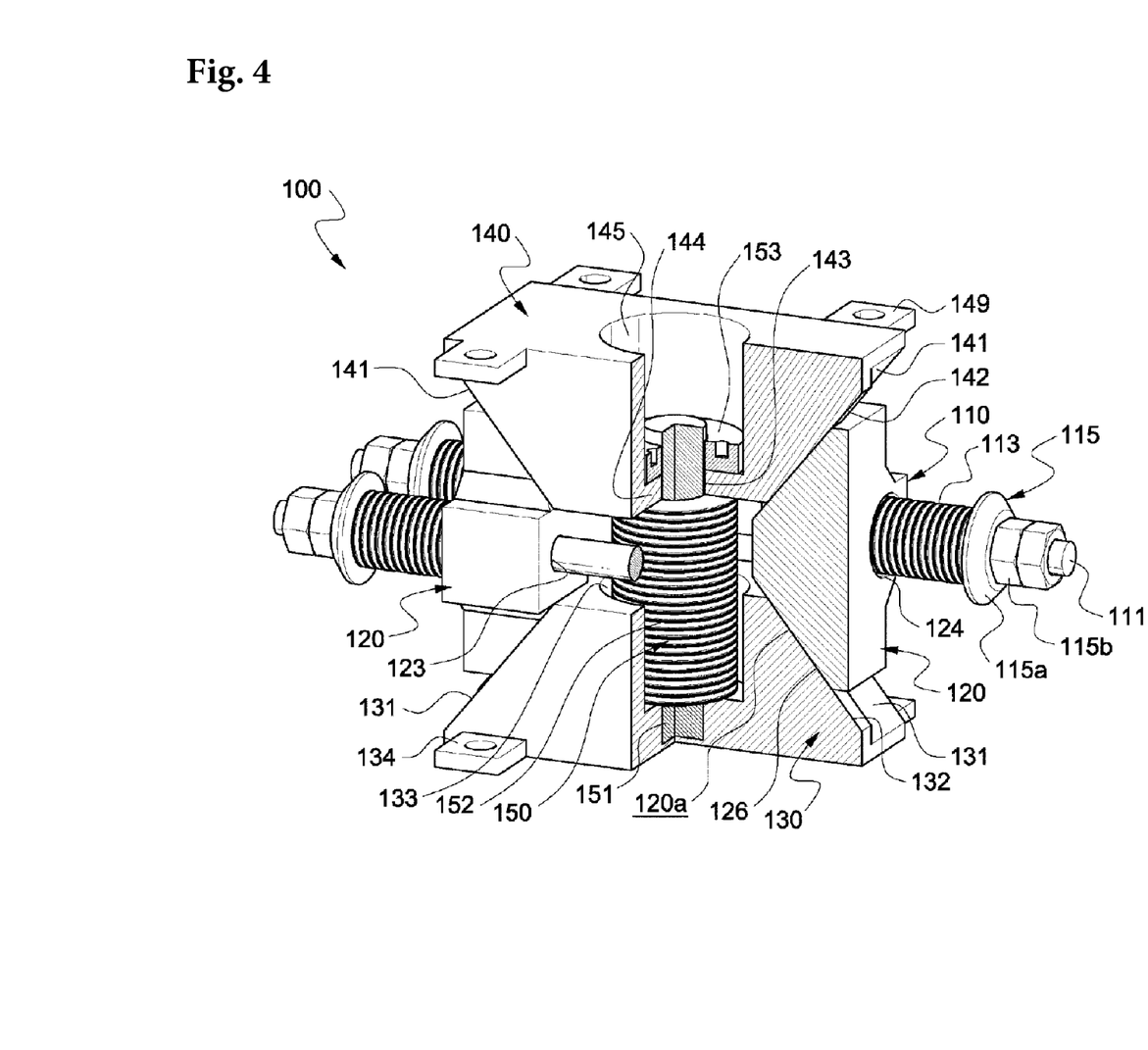
FIG. 4 is a partial-cut perspective view of the seismic isolator of FIG. 1.

FIG. 1 is a perspective view of a seismic isolator utilizing wedge according to an embodiment of the invention, FIG. 2 is an exploded perspective view of the seismic isolator of FIG. 1, FIG. 3 is a half-cut perspective view of the seismic isolator of FIG. 1 showing the inside thereof, and FIG. 4 is a partial-cut perspective view of the seismic isolator of FIG. 1.

As shown in FIGS. 1 through 4, a seismic isolator (100) according to the invention includes a wedge unit (110). The wedge unit (110) includes a pair of rods (111) disposed in parallel with an interval, a pair of wedges (120) engaging the pair of rods (111) and installed movably to the right and left along the rods (111), a horizontal elastic body (113) supporting the wedge (120) toward inside, and a supporting means (115) supporting the horizontal elastic body (113).

In the pair of wedges (120), the wedge surfaces (120a) having a wedge bottom surface (121) and a wedge top surface (122) are disposed to the right and left with an interval facing each other. The wedge bottom surface (121) and the wedge top surface (122) of each wedge (120) have a top and bottom symmetry preferably. In certain embodiments, the wedge bottom surface (121) and the wedge top surface (122) may be made with a top and bottom asymmetry. For example, a tilting of the wedge bottom surface (121) may be made small than that of the wedge top surface (122), or reversely. In the wedge bottom surface (121) and the wedge top surface (122) are formed a guiding portion (125) and the guided portion (126) for guiding or being guided in moving while surface-contacting a wedge bottom surface member (130) and a wedge top surface member (140) explained below and preventing disengaging of the wedge (120) sideways. In this wedge (120) is formed a through-hole (123) engaging the rod (111) and allowing right-and-left movement along the rod (111), and on an outer surface around the through-hole (123) is formed a groove (124).

In a case that a weight acting on the wedge (120) is not very large, one made of plastic may be used for the wedge (120) in the above. For the plastic, ultra-high molecular weight polyethylene (UHMW-PE) or engineering plastic is appropriate. In the case of using plastic, it is easy to manufacture, a unit product price may be lowered, and sometimes a sliding material does not have to be used. In a case of very large weight acting on the wedge (120), the wedge (120) may be made of steel on which sliding material being attached.

In the rod (111) outside the wedge (120) are installed the horizontal elastic bodies (113) respectively, and outside the horizontal elastic body (113) is installed a supporting means (115) supporting the horizontal elastic body (113). An inner end portion of the horizontal elastic body (113) is inserted to the groove (124).

For the horizontal elastic body (113), as shown in FIGS. 1 through 3, a disk spring in a form of a plurality of disks engaging to an outer cylindrical surface of the rod (111) in order is appropriate. The disk spring can exert a large rigidity with a small diameter. According to a usage of the seismic isolator, other types of spring such as a MER spring using an elastic rubber or a coil spring may be used instead of disk spring.

The supporting means (115) includes a supporting body (115a) installed movably along the rod (111) and supporting the horizontal elastic body (113) and a nut (115b) screw-engaging the rod (111) outside of the supporting body (115a) and adjusting a position of the supporting means (115) so as to enable adjusting of the extent that the horizontal elastic body (113) presses down on the wedge (120). The nut (115b) is fastened at each end of the rod (111) by two for preventing loosening.

In this embodiment, for the rod (111) is used one with threads formed on both end portions and nuts (115b) engaging at the both end portions, but in certain embodiments a bolt with head and a nut engaging the bolt at the other end portion. Also sometimes when an adjustment of position of the supporting means (115) is not necessary, the supporting body (115a) or the nut (115b) can form the supporting means (115) while fixed to the rod (111).

The seismic isolator (100) according to the invention includes a wedge bottom surface member (130). Toward a top surface of the wedge bottom surface member (130) is provided a first tilting surface (131). The first tilting surfaces (131) on both sides support the wedges (120) on both sides while surface-contacting the wedge bottom surfaces (121) of the pair of wedges (120), and produce friction against the wedges (120) moving along the rod (111).

In the first tilting surface (131) is formed a guiding portion (132) of a form of protrusion. This guiding portion (132) engages a guided portion (126) formed as a groove on the wedge bottom surface (121) so as to guide a movement of the wedge (120) and prevent the wedge (120) from disengaging sideways. The first tilting surface (131) of the wedge bottom surface member (130) receives a force of the horizontal elastic body (113) through the wedge bottom surface (121) of the wedge (120).

In a central portion between the first tilting surfaces (131) on both sides of the wedge bottom surface member (130) is formed a spring groove (133), and around four corners of lower portion are formed fixing portions (134) for fixing to foundation bolt or foundation nut installed in a foundation or a lower structure.

The seismic isolator (100) according to the invention includes a wedge top surface member (140). In the wedge top surface member (140) are formed the second tilting surfaces (141) on both right and left sides toward the bottom surface. The second tilting surfaces (141) on both sides are supported by the wedges (120) on both sides while surface-contacting the wedge top surface (122) of the pair of wedges (120), and produce frictions against the wedge top surface (122) of the wedge (120) moving along the rod (111). The second tilting surfaces (141) on both sides are disposed with a right and left symmetry, and preferably form an up and down symmetry with respect to the first tilting surfaces (131) on both sides.

In the second tilting surface (141) is formed a guided portion (142) having a form of protrusion that engages the guiding portion (125) formed in the wedge top surface (122) and guided by the guiding portion (125) in rising and falling. This guided portion (142) performs a function of preventing the wedge (120) from disengaging sideways.

In the wedge top surface member (140) a latching step (144) by boring a hole (143) through a central portion between the second tilting surfaces (141) on both sides, and a groove (145) for allowing a reaction-force resisting step (153) explained below to move up and down. Also, around four corners in a top portion are formed fixing portions (149) for fixing to a bottom portion of the upper structure.

The wedge top surface member (140) in the above is supported while surface-contacting the wedge top surfaces (122) of the pair of wedges (120) and rises and falls according to a change of weight acting up and down with respect to the wedge bottom surface member (130), so as to produce friction against the wedge top surface (122). This wedge top surface member (140) is supported by the horizontal elastic body (113) through the wedge top surface (122).

Preferably, between the wedge bottom surface member (130) and the wedge top surface member (140) is installed a vertical-elastic-supporting device (150) for absorbing or supporting forces acting between the wedge bottom surface member (130) and the wedge top surface member (140). The vertical-elastic-supporting device (150), as shown in FIGS. 3 and 4, preferably includes an axle member (151) allowing rising and falling of the wedge top surface member (140), which, with a lower end supported by the wedge bottom surface member (130) and an upper end inserted in the hole (143) formed in the wedge top surface member (140), and a vertical elastic body (152) installed on an outer cylindrical surface of the axle member (151) and supporting elastically between the wedge bottom surface member (130) and the wedge top surface member (140).

The vertical-elastic-supporting device (150) may be used in supporting a structure having a large weight according to the kinds of the spring by dividing the weight of the upper structure with the wedge (120) and supporting them, and especially since the weight that must be handled by the wedge (120) is reduced relatively drastically, an angle between a wedge top surface and a wedge bottom surface can be made relatively large and a shock-absorbing function in a direction of up and down is increased, such that it is more adapted to support more safely a structure such as electrical equipments having components that are more sensitive to shocks.

For the vertical elastic body (152) of the vertical-elastic-supporting device (150) in the above, various types of springs such as disk spring, MER spring, coil spring, etc.

Preferably, a lower end of the axle member (151) is fixed to the wedge bottom surface member (130), and in a top end of the axle member (151) is installed a reaction-force resisting step (153) for preventing the wedge top surface member (140) from rising beyond a predetermined height by being latched at a latching step (144).

In certain embodiments, a seismic isolator according to the invention may be made just by installing the axle member (151) and the reaction-force resisting step (153) in a top end portion of the axle member (151) without installing of the vertical elastic body (152).

In the seismic isolator (100) according to the invention as described in the above, when the wedge top surface member (140) rises or falls with respect to the wedge bottom surface member (130) due to vertical earthquakes or vibrations, the wedge (120) moves to the right and left along the rod (111) while supported by the horizontal elastic body (113), produces frictions against the wedge bottom surface member (130) and the wedge top surface member (140), and reduces the up-and-down vibrations of the wedge top surface member (140) and absorbs the up-and-down shocks.

On the other hand, under a regular condition the vertical-elastic-supporting device (150) supports a partial weight of the upper structure acting on the wedge top surface member (140), but when an up-and-down vibration takes place, it supports the wedge top surface member (140) elastically with respect to the wedge bottom surface member (130), and absorbs shocks acting between the wedge top surface member (140) and the wedge bottom surface member (130), reducing the vibration energy.

The reaction-force resisting step (153) prevents the wedge top surface member (140) from rising beyond a predetermined height.

When a right-and-left balance or height of the upper structure is needed to be adjusted due to installing of an additional structure or when the supporting force of the horizontal elastic body (113) is reduced, the balance height, or elastic supporting force can be adjusted by adjusting the nut (115b) and pushing forward or retreating the supporting body (115a).

MODE FOR THE INVENTION

Figure 5:
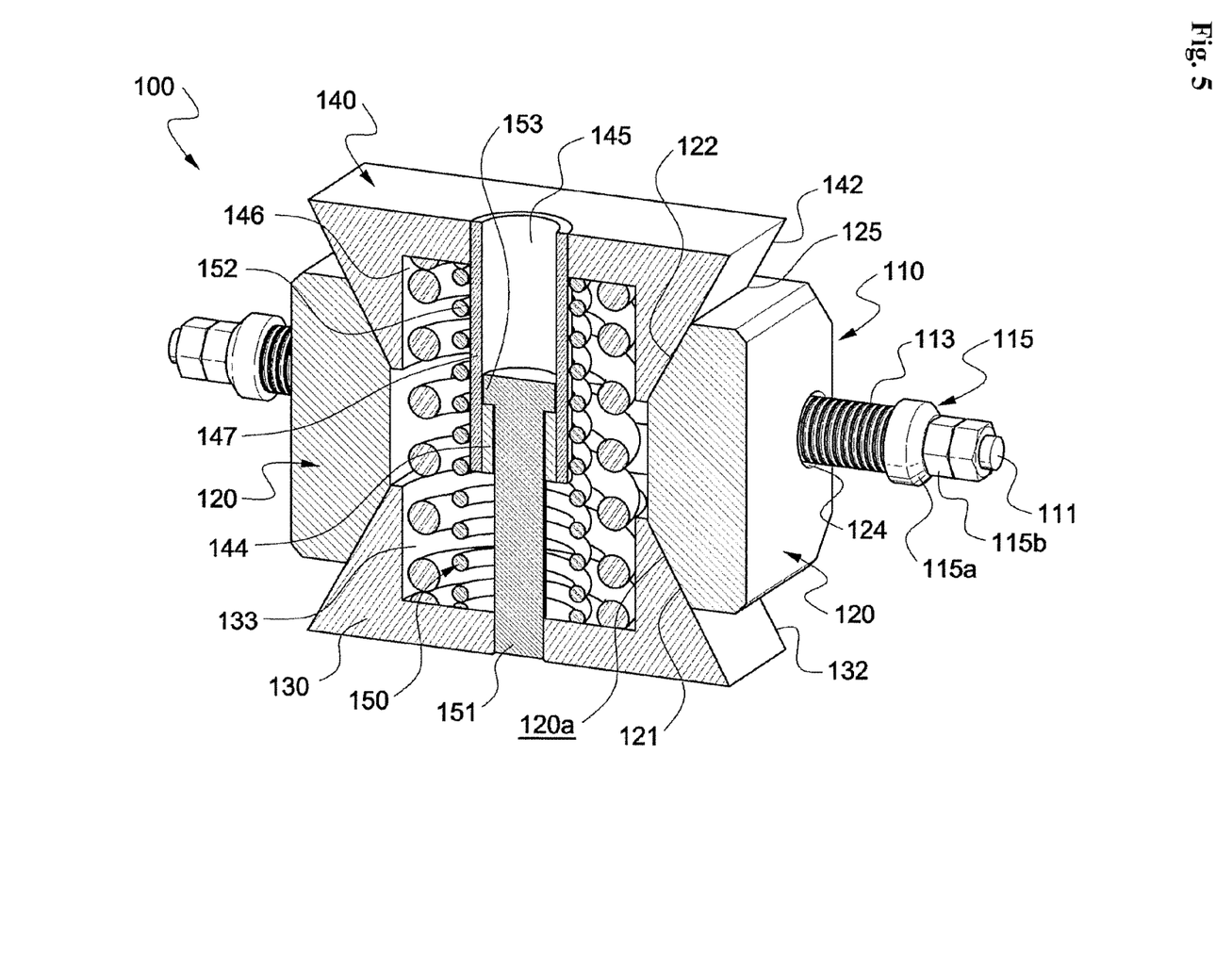
FIG. 5 is a half-cut perspective view of a seismic isolator according to another embodiment of the invention.

FIG. 5 is a half-cut perspective view of a seismic isolator according to another embodiment of the invention.

In certain embodiments, at facing central portions of the wedge bottom surface member (130) and the wedge top surface member (140) are respectively formed spring grooves (133, 146) that are wider than the previous embodiment, and the latching step (144) can be installed in a lower portion of an inner-hole member (147), which is made to protrude into the inside of the spring groove (146) in the wedge top surface member (140).

In the facing spring grooves (133, 146) can be installed a coil spring with the vertical-elastic-supporting device (150). When a coil spring is used, the diameter can be made large so that the supporting between two members is stable, the change of supporting rigidity due to expansion and contraction is linear so that a design is easy, and reacting force and recovering force are excellent so that it is appropriate to use as the vertical-elastic-supporting device (150). And since the coil spring, as shown in FIG. 5, can be installed by plurality having different diameters, when the supporting rigidity of the vertical-elastic-supporting device (150) needs to be increased or decreased according to situations in the construction site, the supporting rigidity of the vertical-elastic-supporting device (150) can be increased or decreased easily by adding, replacing, or removing a small coil spring, not necessarily with a need to replace the whole thing.

And the guiding portion (125) and the guided portion (126) installed in the wedge (120) may be formed as wide as a back-and-forth width of the wedge bottom surface member (130) and the wedge top surface member (140). In doing so, both back-and forth side spherical surface of the wedge bottom surface member (130) performs a role of the guiding portion (132) guiding rising and falling of the wedge (120), and both back-and forth side surface of the wedge top surface member (140) performs a role of the guided portion (142) of being guided by the guiding portion (125) formed on the wedge top surface (122).

In the seismic isolator (100) in FIG. 5, in the wedge bottom surface member (130) and the wedge top surface member (140), as in the previous embodiment, is installed a fixing portion, and by being fixed directly to an upper structure and a lower structure through the fixing portion, it can be made to be used as a seismic isolator or height-adjusting device for reducing up-and-down vibrations, or by installing further a device for other functions on one or both sides of the wedge bottom surface member (130) and the wedge top surface member (140), a seismic isolator with multiple functions can be made.

The rest is same as in the above regarding FIGS. 1 through 4.

Figure 6:
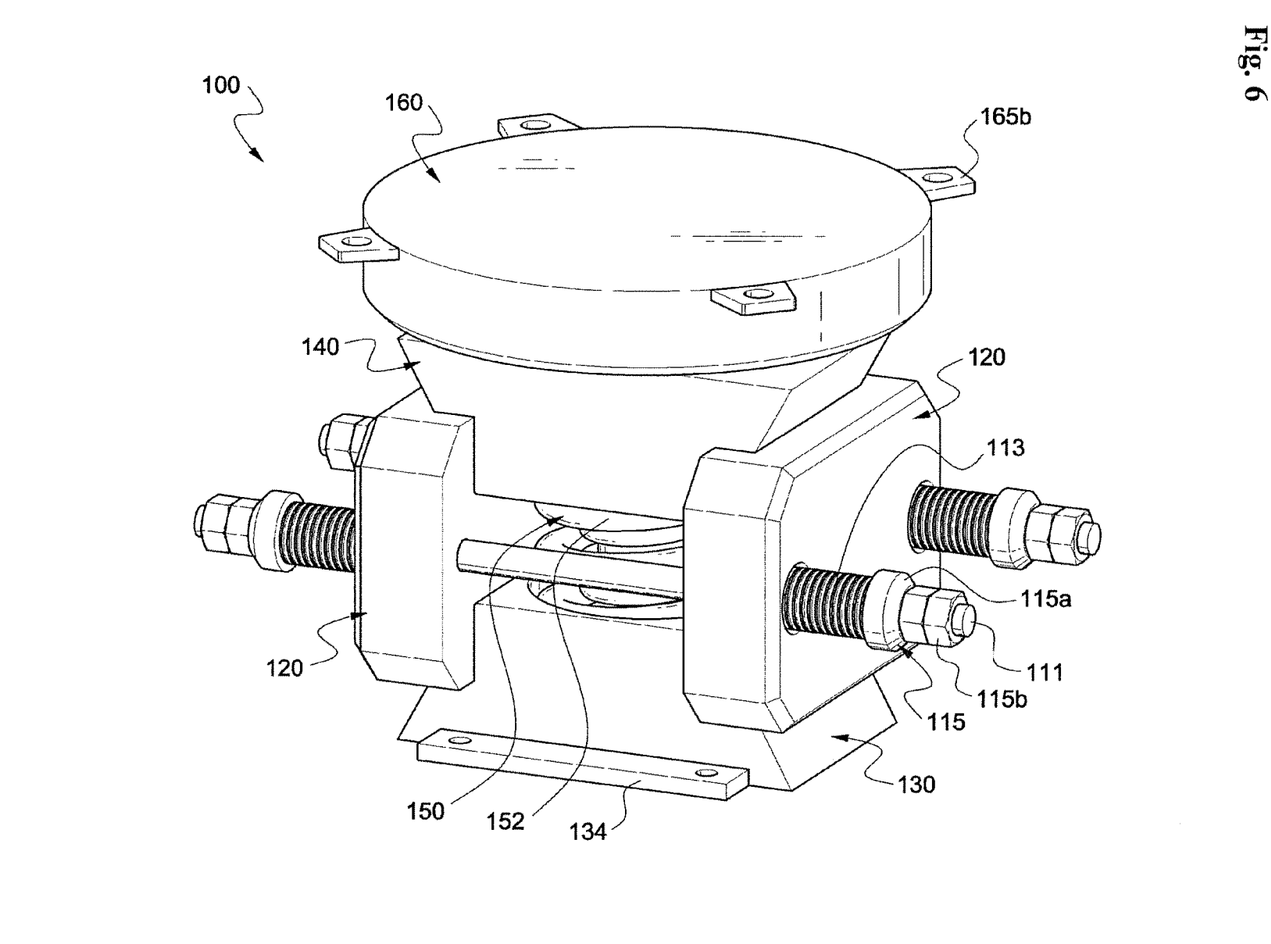
FIG. 6 is a perspective view of a variant of the seismic isolator of FIG. 5.
Figure 7:
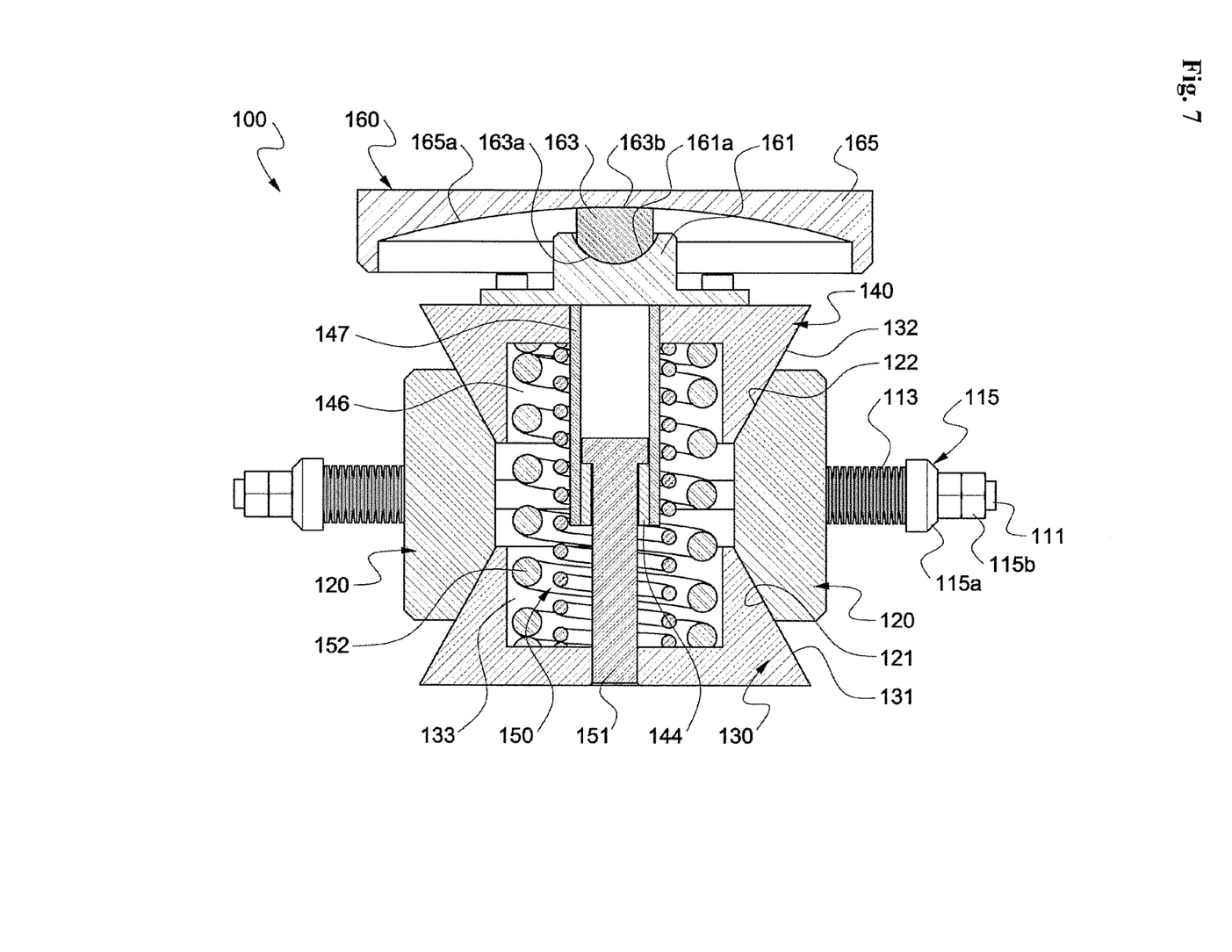
FIG. 7 is a cross-sectional view of the seismic isolator of FIG. 6.

FIG. 6 is a perspective view of a variant of the seismic isolator of FIG. 5, and FIG. 7 is a cross-sectional view of the seismic isolator of FIG. 6.

In certain embodiments, in a lower portion of the wedge bottom surface member (130) is installed a fixing portion (134) so as to be fixed to a foundation bolt or nut installed in the foundation or lower structure, and by installing further a horizontal-direction seismic isolator (160) in the wedge top surface member (140), a seismic isolator can be made. This horizontal-direction seismic isolator (160) is configured to have a seismic isolating function against a horizontal earthquake while allowing horizontal displacement of an upper structure by engaging the upper structure on the top of the wedge top surface member (140).

The horizontal-direction seismic isolator (160) in this embodiment comprises a concave spherical member (161) installed in the wedge top surface member (140) and formed with a first concave spherical surface (161a) on the top, a spherical block (163) having a first convex spherical surface (163a) surface-contacting the first concave spherical surface (161a) formed on a bottom surface thereof and a second convex spherical surface (163b) with a curvature larger than that of the first convex spherical surface (163a) on a top surface thereof, and an upper member (165) supported through surface-contacting to the second convex spherical surface (163b) on a bottom surface so as to be movable in both directions forward and backward and to the right and left. In the top member (165) is installed a fixing portion (165b) for fixing to the upper structure.

The rest is same as in the above regarding FIG. 5.

The seismic isolator (100) in FIGS. 6 and 7 accommodates the displacement of the supporting structure in horizontal and up-and-down directions, and at the same time reduces the vibration energy of the supporting structure by friction and the expansion and contraction of the spring, and absorbing shocks.

Also in this embodiment, the pair of right and left wedges, the wedge bottom surface member (130), the wedge top surface member (140), and the horizontal elastic body (113) are disposed preferably with a right-and-left symmetry, and the wedge top surface (122) and the wedge bottom surface (121) of the wedge (120) have an up-and-down symmetry.

Figure 8:
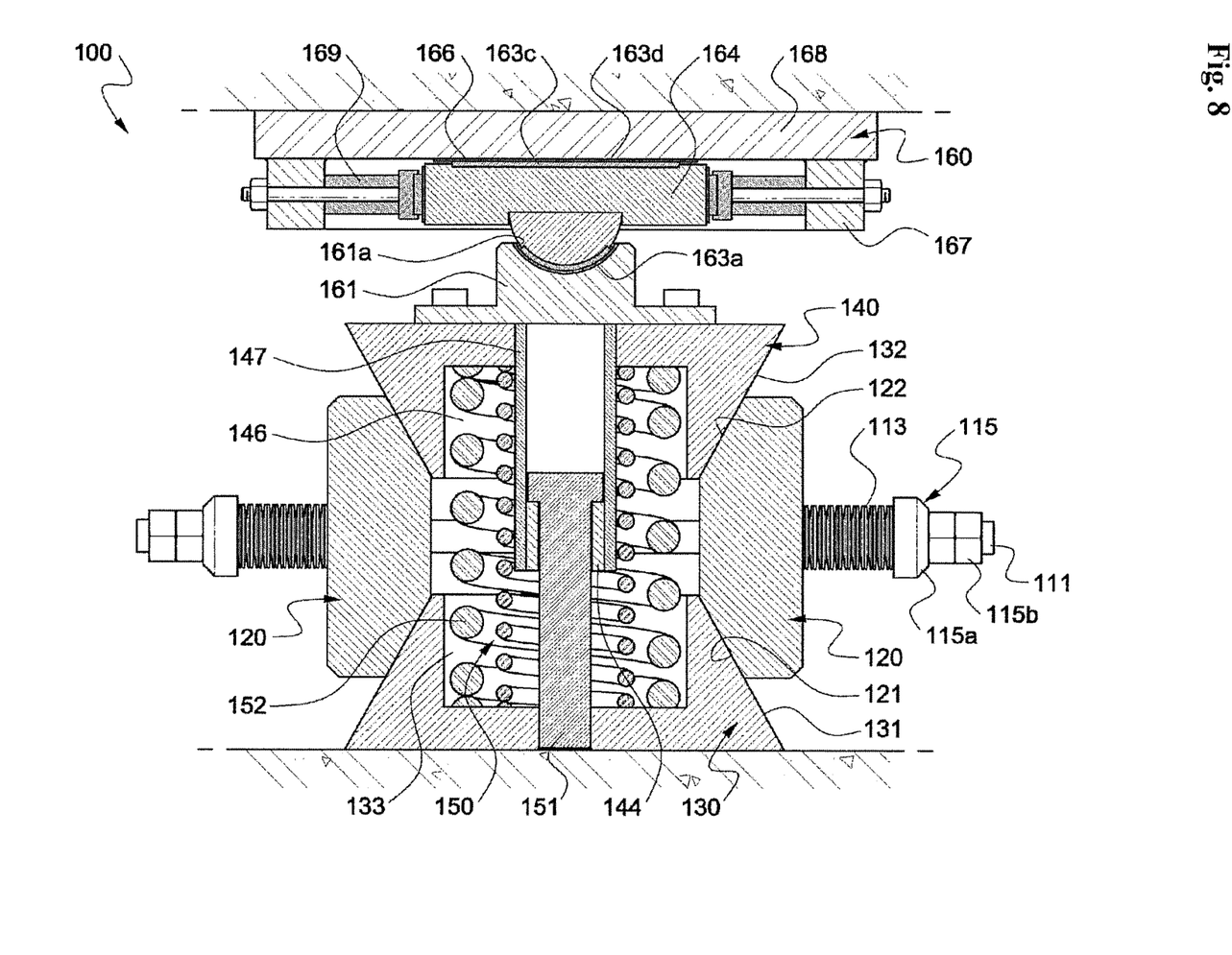
FIG. 8 is a cross-sectional view of a variant of the seismic isolator of FIG. 7.

FIG. 8 is a cross-sectional view of a variant of the seismic isolator of FIG. 7.

In certain embodiments, the horizontal-direction seismic isolator (160) comprises a concave spherical member (161) installed in the wedge top surface member (140) and formed with a first concave spherical surface (161a) on the top, a bearing block (164) with a first convex spherical surface (163a) surface-contacting the first concave spherical surface (161a) on the bottom surface and a flat surface (163d) installed with a sliding material (163c) such as PTFE, etc. on the top, a top member (168) with a sliding material (166) such as stainless steel plate on the bottom surface and a protruding portion (167) protruding downward from right-and-left and/or front-and-rear positions away from the bearing block (164), and a horizontal elastic device (169) installed between the protruding portion (167) and the bearing block (164) and providing a horizontal recovering force.

For the horizontal-direction seismic isolator (160) installed on the wedge top surface member (140), various types of various conventional ones other than the forms shown in the above can be used.

Figure 9:
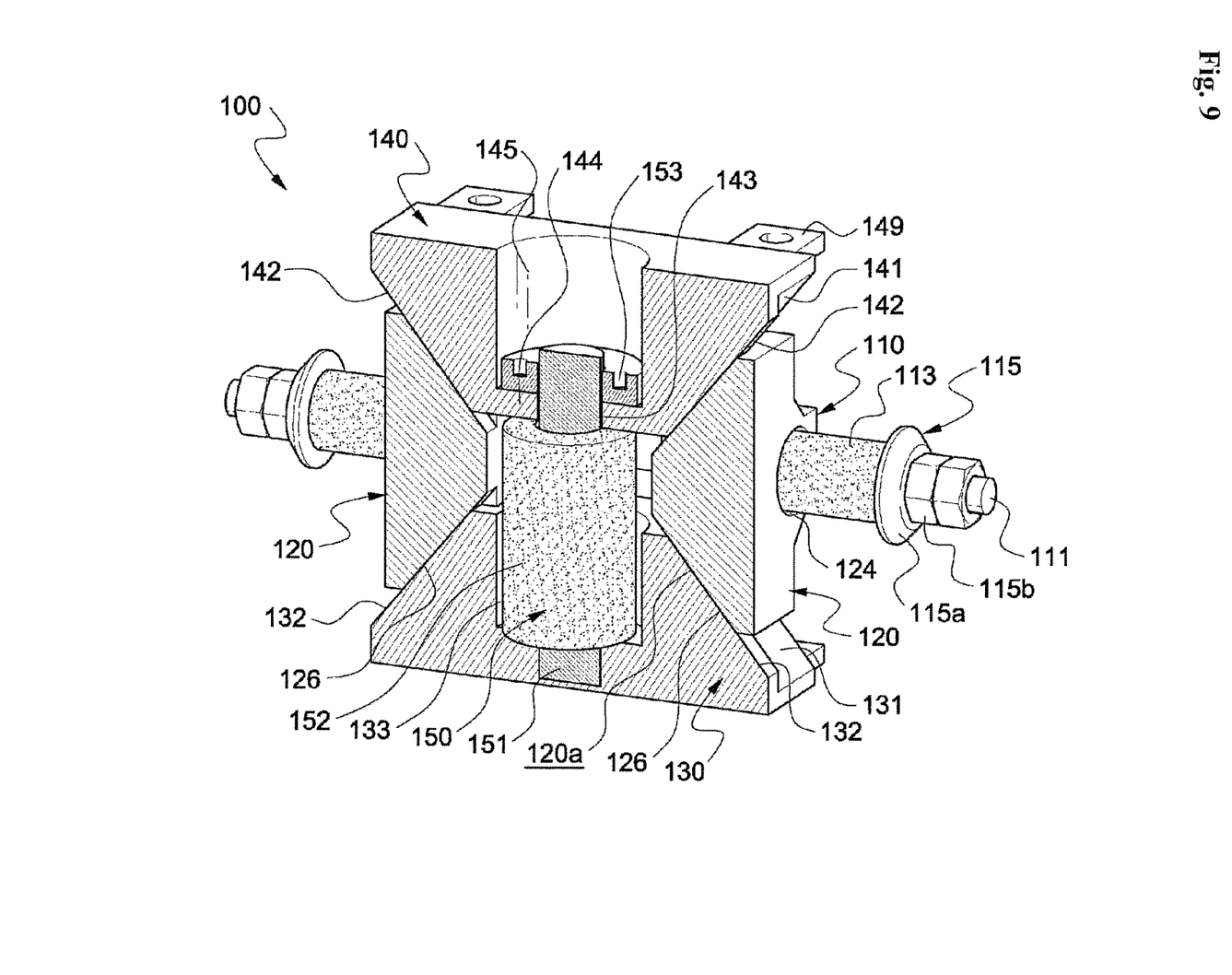
FIG. 9 is a half-cut perspective view of a variant of the seismic isolator of FIG. 3.

FIG. 9 is a half-cut perspective view of a variant of the seismic isolator of FIG. 3.

In certain embodiments, for the horizontal elastic body (113) and the vertical elastic body (152) of the vertical-elastic-supporting device (150), a MER spring using rubber such as polyurethane, etc. The MER spring can allow large compression strain on a small area, and is appropriate to very large structures (engineering structures, etc.), and where a very large displacement is needed.

In certain embodiments, a coil spring is used for the vertical elastic body (152) of the vertical-elastic-supporting device (150) and a MER spring is used just for the horizontal elastic body (113), or the reverse is possible.

For the horizontal elastic body (113) and the vertical elastic body (152) of the vertical-elastic-supporting device (150), according to the applications, one can be selected from coil spring, dish spring, and MER spring. Any other springs can be used if they can perform to the extent same as the coil spring, the dish spring, and the MER spring.

The rest is same as in the above regarding FIGS. 1 through 4.

Figure 10:
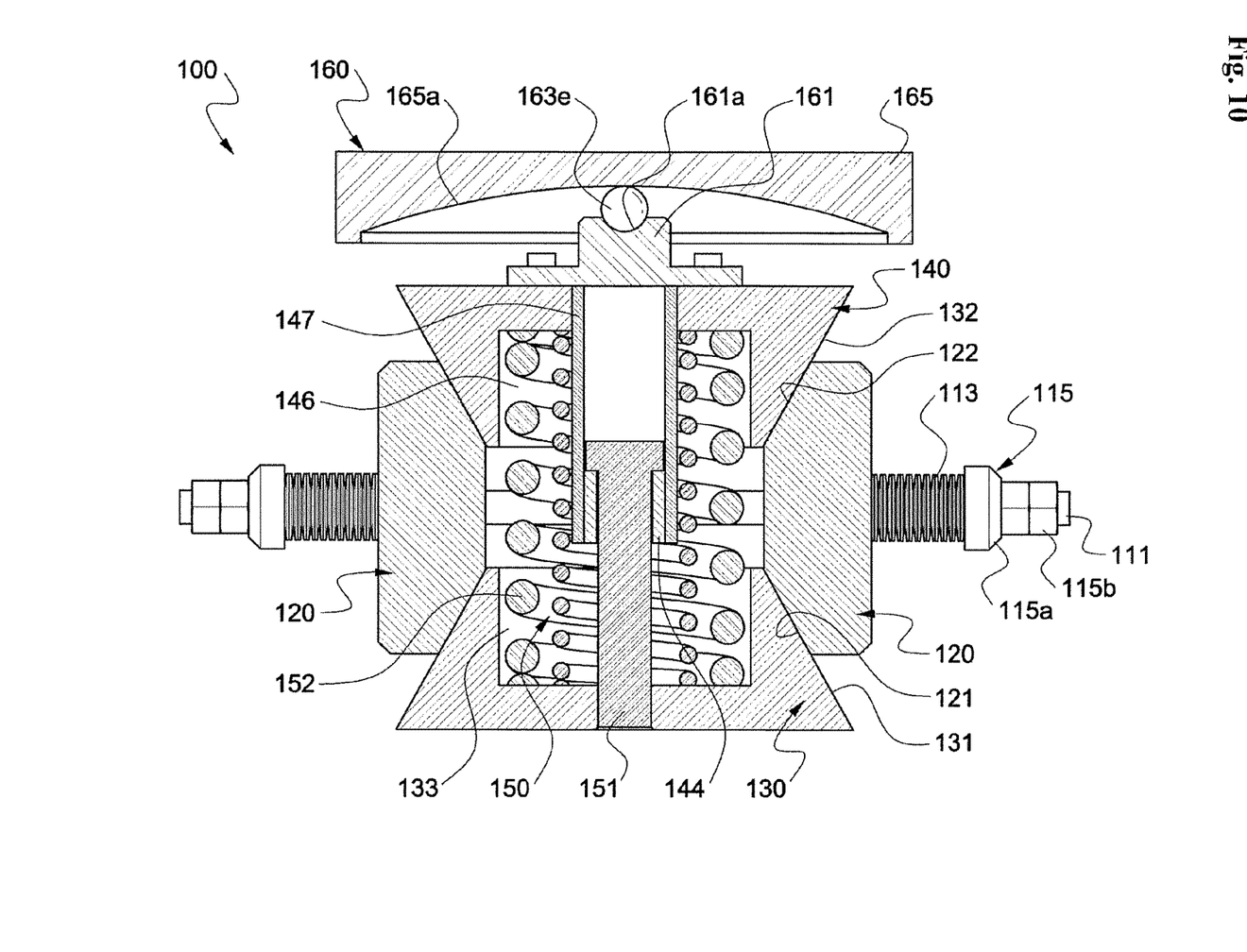
FIG. 10 is a cross-sectional view of a variant of the embodiment of FIG. 7.

FIG. 10 is a cross-sectional view of a variant of the embodiment of FIG. 7.

In this embodiment, the horizontal-direction seismic isolator (160) includes a concave spherical surface member (161) installed in the wedge top surface member (140) and having a first concave spherical surface (161a) formed on the top. For this concave spherical surface member (161), a metal one with a sliding material installed on a surface of the first concave spherical surface (161a) or a plastic one without a sliding material may be used. For the plastic, an engineering plastic is appropriate.

The horizontal-direction seismic isolator (160) includes a ball (163e) installed in the first concave spherical surface (161a) and a top member (165) having a second concave spherical surface (165a) with a curvature larger than the first concave spherical surface (161a) and supported by the ball (163e).

For the ball (163e), a steel ball is appropriate, but if it is used where a light-weight equipment is supported, a plastic one may be used. This holds true for the top member.

The rest is same as in the above regarding FIG. 7.

Since the top member (165) and a structure supported thereon can move both directions, forward and backward and to the right and left with very small friction by rolling of the ball (163e), and since the response acceleration transferred to the supporting structure supported on the top member (165) can be made small, the seismic isolator (100) as shown in FIG. 10 may be used properly in supporting a very sensitive equipment such as a light-weight electronic device compared to massive objects.

The rest is same as in the above regarding FIGS. 6 and 7.

Sometimes, the embodiments described in the above may be used upside down.

Also, the embodiments described in the above can be varied within the spirit of the invention, to increase or decrease the number of the rod, and the horizontal seismic isolator can be modified to other types performing similar functions of prior arts but more excellently.

INDUSTRIAL APPLICABILITY

The seismic isolator utilizing wedge according to the invention can be used more suitably to protect important industrial equipments such as electrical equipments, and may be used likely to a seismic isolator for a bridge bed or general structures. Also, the seismic isolator utilizing wedge according to the invention may be made in small-size and used to absorb shocks for precision equipments, and for a shock-absorbing device of vibration-less vehicles. Furthermore, the seismic isolator utilizing wedge according to the invention may be used as a height-adjusting device with a shock-absorbing function by increasing the supporting rigidity of a horizontal elastic body. In some cases, the invention may be used to make a seismic isolator supporting light-weight electronic equipments, etc.

The invention claimed is:

1. A seismic isolator utilizing wedge comprising:
a wedge unit including a rod, a pair of wedges installed movably along the rod and having two wedge surfaces facing each other, a horizontal elastic body engaging the rod and supporting in a direction for the pair of wedges to come near, and a supporting means supporting the horizontal elastic body toward the wedges;

a wedge bottom surface member supporting the pair of wedges as surface-contacting the wedge bottom surfaces of the pair of wedges and applying friction against the wedge bottom surfaces when the wedges move along the rod; and a wedge top surface member rising and falling according to a change of weight acting by supporting on the pair of wedges while surface-contacting with the wedge top surface of the wedge surface of the pair of wedges, generating friction with the wedge top surface, and receiving an elastic force of the horizontal elastic body through the wedge.

2. The seismic isolator utilizing wedge of claim 1, wherein a vertical-elastic-supporting device for shock-absorbing or supporting force interacting between the wedge bottom surface member and the wedge top surface member is provided between the wedge bottom surface member and the wedge top surface member.

3. The seismic isolator utilizing wedge of claim 2, wherein the vertical-elastic-supporting device comprises an axle member having a lower end supported by the wedge bottom surface member and an upper end inserted into a hole or groove formed in the wedge top surface member and allowing the rising and falling of the wedge top surface member and a vertical elastic body engaging an outer cylindrical surface of the axle member and supporting between the wedge bottom surface member and the wedge top surface member.

4. The seismic isolator utilizing wedge of claim 3, wherein a latching step is formed at a top portion of the hole or groove in the wedge top surface member, the lower end of the axle member is fixed to the wedge bottom surface member, and at the upper end of the axle member is installed the a reaction-force resisting step for preventing the wedge top surface member from rising beyond a predetermined spot by being latched to the latching step.

5. The seismic isolator utilizing wedge of claim 1, wherein in the wedge bottom surface member, the wedge top surface member, and corresponding contacting spherical surface of the wedges are formed guiding portions and guided portions for guiding and being guided in moving as surface-contacted together and preventing the wedge from disengaging sideways with respect to the wedge bottom surface member and the wedge top surface member.

6. The seismic isolator utilizing wedge of claim 1, wherein a latching step is formed at a top portion of a hole or groove in the wedge top surface member, an axle member is installed between the wedge top surface member and the wedge bottom surface member, a lower end of the axle member is fixed to the wedge bottom surface member and at an upper end of the axle member that pass through the hole is installed a reaction-force resisting step for preventing the wedge top surface member from rising beyond a predetermined spot by being latched to the latching step.

7. The seismic isolator utilizing wedge of claim 1, wherein a horizontal seismic isolating device is installed on top of the wedge top surface member, which engages a top structure and allows the top structure to move in any one direction of forward and backward and to the right and left with respect to the wedge top surface member or two directions of forward and backward and to the right and left with respect to the wedge top surface member.

8. The seismic isolator utilizing wedge of claim 7, wherein the horizontal seismic isolating device comprises a concave spherical member installed in the wedge top surface member and formed with a first concave spherical surface on the top, a spherical block having a first convex spherical surface surface-contacting the first concave spherical surface formed on a bottom surface thereof and a second convex spherical surface with a curvature larger than that of the first convex spherical surface on a top surface thereof, and an upper member supported through surface-contacting to the second convex spherical surface on a bottom surface so as to be movable in both directions forward and backward and to the right and left.

9. The seismic isolator utilizing wedge of claim 1, wherein the pair of wedges, the wedge bottom surface members, the wedge top surface members, and the horizontal elastic bodies are disposed left-right symmetrically, and the wedge top surfaces and the wedge bottom surfaces are top-bottom symmetrical.

10. The seismic isolator utilizing wedge of claim 1, wherein the supporting means comprises a supporting body that is installed movably along the rod for supporting the horizontal elastic body, and a nut that is configured to adjust an extent that the horizontal elastic body presses the wedge by screw-engaging the rod outside the supporting body supporting the horizontal elastic body and adjusting a position of the supporting means.

11. The seismic isolator utilizing wedge of claim 1, wherein the wedge is made of ultra-high molecular weight polyethylene (UHMW-PE) or engineering plastic, and the wedge bottom surface member and the wedge top surface member are made of metal.

12. The seismic isolator utilizing wedge of claim 7, wherein the horizontal seismic isolating device comprises a concave spherical member installed in the wedge top surface member and including a first concave spherical surface formed on a top surface thereof, a ball installed in the first concave spherical surface, and a top portion member including a second concave spherical surface having a curvature larger than that of the first concave spherical surface on the bottom thereof and being able to move both directions forward and backward and to the right and left while supported by the ball.

13. The seismic isolator utilizing wedge of claim 2, wherein in the wedge bottom surface member, the wedge top surface member, and corresponding contacting spherical surface of the wedges are formed guiding portions and guided portions for guiding and being guided in moving as surface-contacted together and preventing the wedge from disengaging sideways with respect to the wedge bottom surface member and the wedge top surface member.

14. The seismic isolator utilizing wedge of claim 2, wherein a latching step is formed at a top portion of a hole or groove in the wedge top surface member, an axle member is installed between the wedge top surface member and the wedge bottom surface member, a lower end of the axle member is fixed to the wedge bottom surface member and at an upper end of the axle member that pass through the hole is installed a reaction-force resisting step for preventing the wedge top surface member from rising beyond a predetermined spot by being latched to the latching step.

15. The seismic isolator utilizing wedge of claim 2, wherein a horizontal seismic isolating device is installed on top of the wedge top surface member, which engages a top structure and allows the top structure to move in any one direction of forward and backward and to the right and left with respect to the wedge top surface member or two directions of forward and backward and to the right and left with respect to the wedge top surface member.

16. The seismic isolator utilizing wedge of claim 2, wherein the pair of wedges, the wedge bottom surface members, the wedge top surface members, and the horizontal elastic bodies are disposed left-right symmetrically, and the wedge top surfaces and the wedge bottom surfaces are top-bottom symmetrical.

17. The seismic isolator utilizing wedge of claim 2, wherein the supporting means comprises a supporting body that is installed movably along the rod for supporting the horizontal elastic body, and a nut that is configured to adjust an extent that the horizontal elastic body presses the wedge by screw-engaging the rod outside the supporting body supporting the horizontal elastic body and adjusting a position of the supporting means.

18. The seismic isolator utilizing wedge of claim 2, wherein the wedge is made of ultra-high molecular weight polyethylene (UHMW-PE) or engineering plastic, and the wedge bottom surface member and the wedge top surface member are made of metal.

19. The seismic isolator utilizing wedge of claim 3, wherein in the wedge bottom surface member, the wedge top surface member, and corresponding contacting spherical surface of the wedges are formed guiding portions and guided portions for guiding and being guided in moving as surface-contacted together and preventing the wedge from disengaging sideways with respect to the wedge bottom surface member and the wedge top surface member.

20. The seismic isolator utilizing wedge of claim 3, wherein a horizontal seismic isolating device is installed on top of the wedge top surface member, which engages a top structure and allows the top structure to move in any one direction of forward and backward and to the right and left with respect to the wedge top surface member or two directions of forward and backward and to the right and left with respect to the wedge top surface member.

* * * * *